(No Model.)
J. STEELE.
EYE PROTECTOR FOR HORSES.
No. 481,152. Patented Aug. 16, 1892.
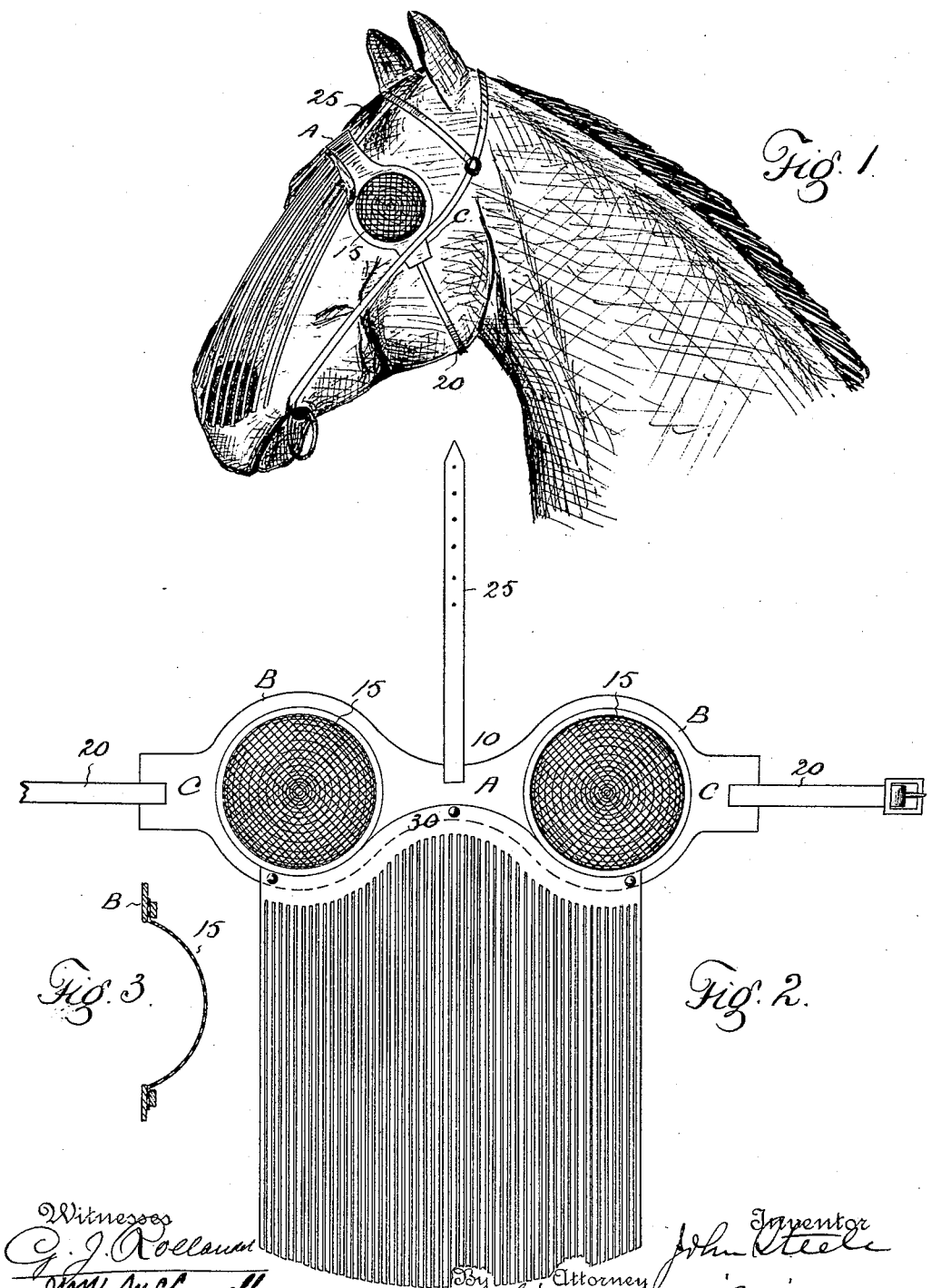

UNITED STATES PATENT OFFICE.

JOHN STEELE, OF DENVER, COLORADO.

EYE-PROTECTOR FOR HORSES.

SPECIFICATION forming part of Letters Patent No. 481,152, dated August 16, 1892.

Application filed August 27, 1891. Serial No. 403,912. (No model.)

*To all whom it may concern:*

Be it known that I, JOHN STEELE, a citizen of the United States of America, residing at Denver, in the county of Arapahoe and State of Colorado, have invented certain new and useful Improvements in Eye-Protectors for Horses; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in eye-protectors for horses, and its object is to provide a device which will effectually prevent injury to the eyes of horses or other animals through the action of flies or other insects, dust, dirt, &c., said device to be of simple and economical construction, reliable, durable, and thoroughly practical in use. This object I accomplish by the use of the mechanism illustrated in the accompanying drawings, in which—

Figure 1 illustrates the head of a horse with my improved protector in place. Fig. 2 is an enlarged plan view of the device in detail. Fig. 3 is a transverse section taken through one of the eye-screens.

In the views, similar reference-characters indicating corresponding parts of the mechanism, let the numeral 10 designate a strip of leather or other suitable flexible or pliable material. Part 10 consists of a central portion A, adapted to engage the head of the animal, and two parts B B, surrounding the eyes and provided with apertures having coverings 15 15, composed of some suitable perforated or foraminated material of suitable mesh, preferably wire-cloth or some other material which will maintain its shape under ordinary circumstances. These coverings 15 15 must stand out from the eyes of the animal, and for this purpose they are made preferably concavo-convex in shape, as shown in Fig. 3— that is, concave interiorly and convex exteriorly. The extremities of parts 10 consist of extensions C C, to which are attached straps 20 20, the extremities of which are adapted to buckle together when the device is applied to the head of the horse, as shown in Fig. 1. To the central portion of part 10 is secured an upwardly-extending strap 25, the outer extremity of which is provided with apertures and fashioned for attachment to the upper portion of the bridle provided with a buckle for the purpose.

Part 10 may be provided with a strip of leather 30 or other suitable flexible material hanging down therefrom when in position. This part 30 is cut into strings or narrow strips, as shown in Fig. 2, except its extreme upper portion, which may be integral with part 10 or secured thereto in any suitable manner, as by providing the one part with buttons and the other with apertures or buttonholes. This means of attachment is illustrated in Fig. 2. This part 30 is designed to keep flies and other insects from the nose of the horse or animal.

The manner of applying the device to the head of the horse is illustrated in Fig. 1. The parts 15 are placed over the eyes of the horse, while straps 20 are carried backward therefrom and buckled together. Strap 25 is attached to the upper portion of the bridle, as before stated. The portion for protecting the eyes may be used either separately or in connection with part 30, as may be desired.

Having thus described my invention, what I claim is—

As a new article of manufacture, an insect-shield for animals, consisting of a strip 10, of flexible material, provided with apertures having perforated or foraminated concavo-convex coverings, and a downwardly-extending flexible piece 30, formed integral with or attached to part 10 and consisting of strings adapted to protect the nose of the animal, and suitable means for attaching the device to the head, substantially as described.

In testimony whereof I affix my signature in presence of two witnesses.

JOHN STEELE.

Witnesses:
WM. MCCONNELL,
G. J. ROLLANDET.